No. 648,457. Patented May 1, 1900.
W. M. FLINN.
BICYCLE ATTACHMENT.
(Application filed Aug. 31, 1897.)
(No Model.) 2 Sheets—Sheet 1.

Witnesses
Inventor
William M. Flinn
By his Attorneys,

No. 648,457. Patented May 1, 1900.
W. M. FLINN.
BICYCLE ATTACHMENT.
(Application filed Aug. 31, 1897.)
(No Model.) 2 Sheets—Sheet 2.

Witnesses
Inventor
William M. Flinn
By his Attorneys,
C. A. Snow & Co.

UNITED STATES PATENT OFFICE.

WILLIAM M. FLINN, OF WEATHERFORD, TEXAS.

BICYCLE ATTACHMENT.

SPECIFICATION forming part of Letters Patent No. 648,457, dated May 1, 1900.

Application filed August 31, 1897. Serial No. 650,189. (No model.)

*To all whom it may concern:*

Be it known that I, WILLIAM M. FLINN, a citizen of the United States, residing at Weatherford, in the county of Parker and State of Texas, have invented a new and useful Bicycle Attachment, of which the following is a specification.

My invention relates to improvements in bicycle attachments; and one object that I have in view is to provide an attachment which may be used as a support for the bicycle and as a carrier or support for a child, a package, a satchel, &c.

A further object of the invention is to provide an improved attachment which may be readily applied to any ordinary style of bicycle and which is so constructed as to hold itself rigidly or steadily in place on the steering-head of the bicycle when the attachment is turned to its upright position to serve as a luggage-carrier or as a child's support.

With these ends in view the invention consists in a support adapted for attachment to the front axle or front fork of a bicycle and provided with a clip or loop arranged to clasp the steering-head of a bicycle when turned to an upright position above the front bicycle-wheel.

The invention further consists in the novel construction and arrangement of parts forming the improved support, all as will be hereinafter fully described and claimed.

To enable others to understand the invention, I have illustrated the preferred embodiment thereof in the accompanying drawings, forming a part of this specification, and in which—

Figure 1:
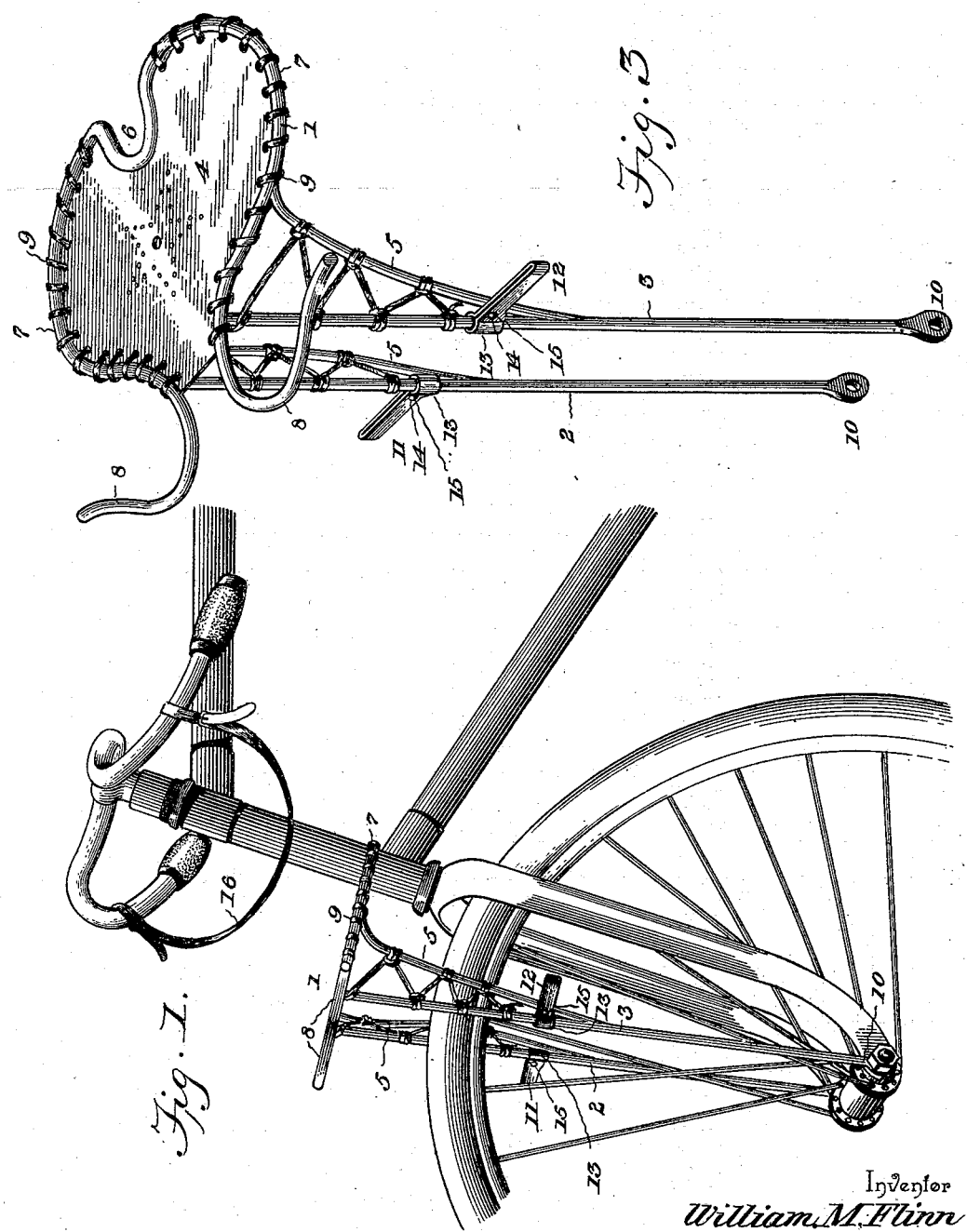
Figures 2, 4, 5:
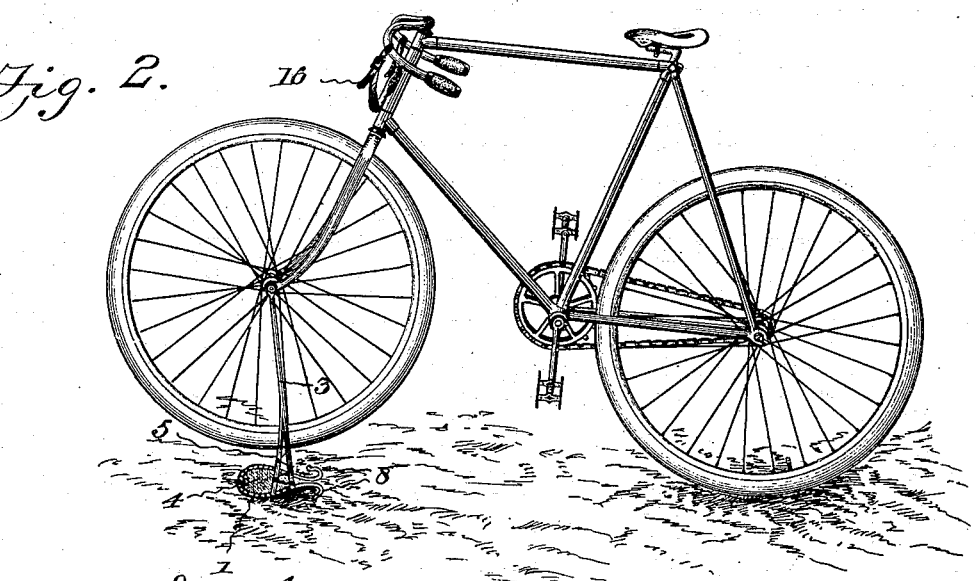

Figure 1 is a perspective view of a bicycle, showing my support applied thereto and engaging with the steering-head of the machine to serve as a child's support or a luggage-carrier. Fig. 2 is a perspective view of a bicycle with the support adjusted in its lowered position for the purpose of holding the bicycle steadily in place. Fig. 3 is a detached perspective view, on an enlarged scale, of the support detached from the bicycle. Fig. 4 is a plan view of the support, showing the seat thereof and illustrating by dotted lines the position of the bicycle steering-head within the loop or clip of the support. Fig. 5 is a vertical sectional view through the support on the plane indicated by the dotted line 5 5 of Fig. 4.

Like numerals of reference denote corresponding parts in all the figures of the drawings.

My improved support consists of a seat-holding frame 1, a pair of arms or bars 2 3, united rigidly to the seat-holding frame and extending therefrom substantially at right angles to the plane of said frame, a seat 4, attached to and within the seat-holding frame, and stays or braces 5, having their respective ends fastened to the seat-holding frame and to the arms or bars.

In the preferred embodiment of the invention the seat-holding frame is made from a single bar or rod bent to the peculiar form shown by Fig. 4 of the drawings. This bar or rod is first bent at its middle to form the curved loop or clip 6, after which the bar is bent into the curved form indicated by the numeral 7, and the ends of the bar are curved outwardly away from each other to provide the guards or arms 8. The seat 4 is a single piece of suitable material, preferably leather, which is stamped or cut to conform to the shape of the frame 1, within which the seat is placed. The seat is united to the frame 1 by the lacing-cord 9, which is threaded through eyelets provided near the marginal edge of the seat and passed around the curved parts of the seat-frame 1; but this method of holding the seat within the seat-frame is not material and may be varied or changed as deemed expedient by the manufacturer or a skilled mechanic.

The arms or bars 2 are joined with the seat-frame 1 near the points where the outwardly-extending arms 8 diverge from each other. The bars or arms may be joined to the seat-frame in any suitable way—as, for instance, by welding the parts together. These arms or bars are of a length greater than half the diameter of the bicycle-wheel to which the attachment is to be applied, and the attachment thus serves to sustain the seat a suitable height above the wheel when the attachment occupies its raised position. The attachment may be applied to the bicycle in any suitable way. For example, the free ends of the arms or bars may be provided with eyes 10 to receive the ends of the front axle of a bicycle; but it will be understood that clips may be fastened to the front fork of the bicycle and provided with suitable pintles, on which the arms of the attachment may be loosely fitted.

The braces or stays 5 are each united to the seat-carrying frame 1 and to one of the arms or bars 2 or 3—as, for instance, by welding the parts together. These stays diverge from the points of attachment to the bars or arms to the points where they are joined to the seat-supporting frame, and the stays thus serve to mutually brace and strengthen the seat-frame and the arms or bars.

When the device is to be used as a support for a child, I prefer to provide the foot-rests 11 12, one of which is attached to each arm or bar of the support. Each foot-rest is preferably composed of a single piece of metal, which is doubled upon itself and has its inner ends curved to form jaws 13, said rest provided with transverse apertures 14 at points adjacent to the jaws 13. The foot-rests are applied to the arms or bars of the support in a manner to have the jaws 13 of said rests embrace the arms or bars, and clamping-bolts 15 are then passed through the apertures 14, so as to compress the jaws upon the arms or bars 2 3, and thus clamp the foot-rests firmly and solidly to the parallel bars of the support. The foot-rests extend laterally from opposite sides of the parallel arms of the support, and they are arranged within convenient reach of the child seated upon the support, thus enabling the rider to steady himself upon the support.

In using the device as a child's seat the guards or arms 8 at the front end of the support are adapted to embrace the rider's limbs and prevent the child from tipping or falling in a forward direction over the front wheel. The support having been raised to cause its clasp or loop 6 to have firm frictional engagement with the steering-head, a child is seated on the support for its feet to rest on the foot-rests and the guards or arms 8 to fit against the limbs at or near the thighs, after which the strap 16 is passed around the body and attached to the handle-bar. The child is held securely on the seat against falling off accidentally by the guards or arms 8 and the strap.

In applying my support to a bicycle the parallel arms 2 3 are arranged on opposite sides of the front bicycle-wheel, and the free ends of said arms are pivotally connected to the front axle or to the front steering-fork in the manner hereinbefore described. The support is thus arranged to straddle the front wheel, and it may be adjusted on its pivots to occupy a position either below the wheel or above the same.

When the support is lowered, the seat-frame thereof rests upon the ground below the wheel, and the bicycle is raised slightly above the floor or ground, as shown by Fig. 2 of the drawings. This adjustment of the support provides a secure means for holding the bicycle steadily in place, because the seat-frame and its outwardly bowed or curved arms 8 furnish a broad surface for the support to rest upon the ground, which overcomes any tendency of the bicycle to tilt or cant sidewise.

To use the device as a carrier for baggage or luggage, the bicycle is raised slightly and the support is turned on its pivots to the upright position shown by Fig. 1 of the drawings. During this adjustment of the support the loop or clip of the seat-frame is presented opposite to the steering-head of the bicycle, and the support is now pressed toward the steering-head in order to spread or force open the loop or clip sufficiently for the steering-head of the bicycle to enter therein. This loop or clip is elastic to a sufficient extent to permit the steering-head to slip into said loop, and the elasticity of the loop causes it to embrace the steering-head for the purpose of holding the support steadily in its raised position. This construction of the seat-frame forming part of the support is one of the important features of my invention, because the loop or clip provides a means for detachably attaching the support to the steering-head and holding it securely in place therein when raised, thus dispensing with extraneous fastening means.

In the practical construction of the seat-frame of my invention and in applying the seat to the seat-frame I prefer to arrange the seat about midway between the bar or in central relation thereto. The central arrangement of the seat with relation to the seat-frame is for the purpose of holding the seat in position, so that it will not come in contact with the floor or ground when the device is inverted to serve as a support for the bicycle or machine.

In using the attachment as a support for a child I prefer to employ a strap, (indicated at 16,) which is passed around the body of the child and under its arms, the ends of the strap being fastened to the handle-bar of the bicycle. The employment of this strap prevents the child from falling off the support and adds to the steadiness of the machine.

I am aware that changes in the form and proportion of parts and in the details of construction of the device herein shown and described as the preferred embodiment of my invention may be made by a skilled mechanic without departing from the spirit or sacrificing the advantages of the invention. I therefore reserve the right to make such modifications and alterations as clearly fall within the scope of the invention.

The attachment is simple and durable in construction, easily applied to any ordinary style of safety-bicycle, and it is cheap of manufacture.

Having thus described the invention, what is claimed as new is—

1. As a new article of manufacture, a bicycle stand and carrier comprising a horizontal frame-bar, 1, which is bent at its rear side into the elastic clasp or loop, 6, and the arms arranged substantially at right angles to the frame-bar and joined rigidly to said frame-bar at points on opposite sides of the clasp or loop, substantially as described.

2. As a new article of manufacture, a bicycle stand and carrier comprising a bent frame-bar, 1, provided at its rear side with an inwardly-curved elastic clasp or loop, 6, which lies within the line of said frame-bar, a seat situated within the frame-bar in central relation thereto and united to the same, and the trussed arms joined rigidly to the frame-bar at points on opposite sides of the clasp or loop thereof, substantially as described.

3. A bicycle support and carrier comprising a horizontal frame-bar provided with the outwardly-extended guards or arms 8, the depending arms attached to said frame-bar and provided with foot-rests, and means for attaching the support to a bicycle, substantially as described.

4. The combination with a steering-head, and a front-wheel axle, of an adjustable stand and support comprising a pair of arms attached pivotally to said axle, and an expanded base or platform carried by said arms and provided with an integral elastic clasp or loop which is arranged on one side of the platform and is capable of engaging automatically with the steering-head, whereby the support may be clamped to the steering-head when it is elevated without manipulating fastening devices therefor, substantially as described.

In testimony that I claim the foregoing as my own I have hereto affixed my signature in the presence of two witnesses.

WILLIAM M. FLINN.

Witnesses:
  C. C. LITTLETON,
  H. L. BREVARD.